United States Patent [19]

Nakao

[11] Patent Number: 4,592,815

[45] Date of Patent: Jun. 3, 1986

[54] METHOD OF MANUFACTURING AN ELECTRET FILTER

[75] Inventor: Etsuro Nakao, Motiyama, Japan

[73] Assignee: Japan Vilene Co., Ltd., Tokyo, Japan

[21] Appl. No.: 698,789

[22] Filed: Feb. 6, 1985

[30] Foreign Application Priority Data

Feb. 10, 1984 [JP] Japan .................................. 59-23678

[51] Int. Cl.$^4$ ......................... C07C 3/24; B29C 35/02
[52] U.S. Cl. .................................. 204/165; 204/168; 204/169; 522/157; 522/161; 264/22
[58] Field of Search ............... 204/165, 168, 158 HE, 204/169; 264/22

[56] References Cited

U.S. PATENT DOCUMENTS

| | | | |
|---|---|---|---|
| 4,091,140 | 5/1978 | Harmon | 264/22 |
| 4,215,682 | 8/1980 | Kubik | 264/22 |
| 4,310,478 | 1/1982 | Balsleu | 264/22 |
| 4,430,277 | 2/1984 | Lin | 264/22 |

Primary Examiner—John F. Niebling
Attorney, Agent, or Firm—Pahl, Lorusso & Loud

[57] ABSTRACT

The disclosed method provides an electret filter having a permanent electrostatic charge and formed of polymer fibers having an intrinsic viscosity of 1.5 or less. Fibers of the requisite viscosity are formed into a nonwoven fabric and fed, at room temperature, through a gap between a discharge electrode and a ground electrode while being tightly pressed against the ground electrode. The ground electrode preferably presents a polished metal surface for contact with the web.

15 Claims, 1 Drawing Figure

FIGURE
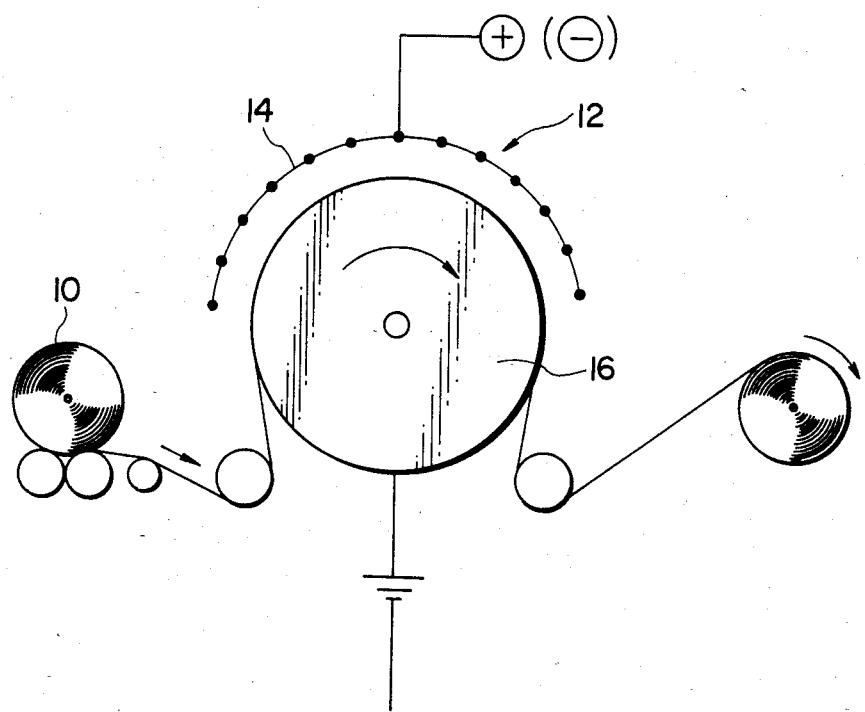

METHOD OF MANUFACTURING AN ELECTRET FILTER

BACKGROUND OF THE INVENTION (a) Field of the Invention

The present invention relates to a method of manufacturing electret filters for efficiently collecting airborne dusts by means of an electrostatic mechanism.

(b) The Prior Art

Methods for manufacturing electret filters taught by the prior art include:

(1) A method involving covering either a mass of layered fibers or an electrode with an electrically permeable film and alternately heating and cooling while applying a high voltage electric field to provide a semi-permanent electric charge (U.S. Pat. No. 3,571,679, Japanese Patent Gazette (Kokoku) No. 4433/1974).

(2) A method for forming a mass of layered fibers by heating a polymeric film to a temperature close to its melting point and passing the heated film through a high voltage electric field provided between positive and negative charge-generating electrodes while stretching the film to provide a semi-permanent electric charge. The charged film is then fibrillated into fine fibers by passing over a needle roller (U.S. Pat. No. 3,998,916).

(3) A method for forming a mass of layered fibers by spraying charged particles onto polypropylene fibers while above their melting point, as they are extruded from orifices by melt-blow spinning into a high speed hot air stream, prior to solidification of the fibers (Japanese Patent Application Laid-Open No. 113900/1979).

(4) A method for imparting an electric charge to a filter material in which a high voltage is impressed across a layered composite of electro-conductive fibrous sheets of cellulose fiber etc. placed on each side of the filter material which, in turn, is composed of fibers of a thermoplastic such as polypropylene. The high voltage is generated by means of at least one pair of corona discharge bars placed on the opposite sides of the assembled sheets, in close proximity thereto (U.S. Pat. No. 4,375,718).

Conventional manufacturing methods (1), (2) and (3), however, have the disadvantage that the fibers must be charged after being heated to a temperature close to their melting point. The advantages of charging at room temperature or cold charging over hot charging are set forth at col 2, lines 6–64 of U.S. Pat. No. 4,375,718. In addition, the method (1) which requires that the electrodes be covered with a weakly conductive asbestos cement is problematic because of the long period of time required for charging to the desired degree. Method (2) in which a mass of layered fibers is formed from a previously electretized film material is excellent in providing the fibers a semi-permanent charge but problematic in that the production process is complicated, requires a long period of time, and is costly. Further, in (2) the thickness of fiber to be produced is limited. Method (3) in which fibers are electrostatically charged as they are extruded through orifices, encounters a problem in that the electrostatic charge imparted to the fibers while still molten is neutralized in part before the fibers solidify and thereby prevented from reaching a sufficient level.

Method (4) offers the advantage that the fibrous sheet can be electrostatically charged in a short time at approximately room temperature. However, it is accompanied by certain disadvantages including the dependency of the amount of electric charges induced or conveyed to the filter material on the condition of contact between the filter material and the electroconductive sheet, and the poor reliability of filtration efficiency due to the tendency of the electric charges to stay only on the fiber surface of the filter material rather than permeate into the interior of the fiber. Further, this method suffers from the disadvantage that migration of the charged particles (ionized air) generated by the corona discharge depends on the electrostatic condition of the filter material and the electroconductive webs, all of which are constantly in frictional contact with the rollers etc.

SUMMARY OF THE INVENTION

The present invention provides a method of efficiently imparting a permanent electrostatic charge to layered fibers at approximately room temperature in a short period of time. The method of the invention includes bringing a non-woven fabric in the form of a web of polyolefinic fibers having intrinsic viscosity not more than 1.5 into tight, preferably intimate, contact with a smooth surfaced ground electrode and electrostatically charging (electretizing) the fabric in a high voltage electric field at approximately room temperature.

The polyolefin synthetic fiber used in the present invention is a non-polarized single, mixed, or composite fiber of polyethylene and/or polypropylene resin spun by a melt-spinning method such as jet-spinning, melt-blowing, or spun-bonding. From the viewpoint of long term stability of the electric charge a non-polarized polyolefin fiber is preferable to a polarized synthetic fiber such as a polyester, polyamide, polyvinyl chloride. With the latter type fibers (polarized), the charge cannot remain stable over a long term and remarkably attenuates by discharge or neutralization.

Further, in the present invention, the intrinsic viscosity $\eta$ of the polyolefinic fiber is no larger than 1.5, preferably, 1.0 or less.

In other words, the fiber has an intrinsic viscosity $\eta$ thermally reduced to no more than 1.5, preferably, 1.0 or less in the extruder and in the nozzle orifice used in the melt-spinning. The value of $\eta$, as referred to herein, is measured by the use of tetralin solution at 135° C. and has reference to the intrinsic vicosity of the polymer melt within the extruder and spinneret, not the intrinsic viscosity of the starting polymer. When the starting material is heated to a temperature exceeding its melting point, chains of the starting polymer molecules are broken (thermal reduction) and its molecular weight and viscosity are reduced. The fiber having $\eta$ of 1.5 or less can optionally be configured in various ways by utilizing different processes and differently shaped nozzle orifices without limit on the heating conditions.

Fibers having a value of $\eta$ exceeding 1.5 do not yield effective electret filters unless subjected to charging for a long period of time while heated to a temperature close to their melting point in the conventional manner.

The present invention provides effective electret filters by using fiber having a value $\eta$ no greater than 1.5, preferably, 1.0 or under and by imparting electric charge thereto for a short period of time not exceeding 10 sec at approximately room temperature. The charge is effectively introduced into both the internal and surface regions of the fibers and remains stable for a long term whereby its dust collecting efficiency is maintained even after storage spanning a half year. The explanation of these advantages is uncertain, however, the inventor theorizes that when a resin is subjected to thermal reduction of viscosity, pyrolyzed and oxidation-decomposed, end portions of the polymer chains become enlarged and assume a state facilitating charging (electrification) and maintenance thereof over a long term. Fibers of the polypropylene series used in this invention may be of the non-stretched type in which component molecules are randomly arranged or of the stretched type in which component molecules are oriented. There is little or no limitation on the polyolefin fiber in any respect, the diameter thereof being optional and determined according to the application for which the electret filter is intended.

BRIEF DESCRIPTION OF THE DRAWINGS

In the drawings: the sole FIGURE is a schematic illustration of one embodiment of the present invention.

DESCRIPTION OF THE PREFERRED EMBODIMENTS

With reference to the sole FIGURE, a nonwoven fabric 10 composed of layers of polyolefin fibers, such as polypropylene or polyethylene, having a value $\eta$ not larger than 1.5, preferably, 1.0 or less, is charged in a high voltage electric field provided by establishing a positive or negative DC voltage of 5 to 10 KV/cm between a discharge electrode 12, made of stainless steel or tungsten wires 14 having a diameter ranging from 0.2 to 1.5 mm, and smooth surfaced ground electrode 16 in the shape of drum or plate.

In practicing the present invention, polyolefin fibers having an intrinsic viscosity not larger than 1.0 are particularly preferred because such fibers enable a more constant and more permanent electrostatic charge to be obtained. In the case of an intrinsic viscosity of 1.0 or less electric charges permeate into the interior of the fiber at room temperature. The surface of the ground electrode which is made of metal and takes the form of, for example, a steel drum, preferably is provided with a mirror-like smooth convex surface so as to maximize contact of the non-woven fabric therewith to enhance the migration of the electric charges into the fibers. Further, pretreatment by either positive or negative ions, of a polarity the same or different from that of the corona discharge element, will yield a further improvement. Examples of effective pretreatments include (1) a corona discharge treatment at a comparatively low voltage and (2) treatment by an ionic irradiation. The pretreatment is effective in diminishing the initial uneven distribution of the electric charges which may otherwise occur during the subsequent, previously described high voltage treatment. This is important because unexpected arcing which might occur at a voltage lower than the rupture voltage can be prevented, and stable or continuous production of the electret filter is made possible. Moreover, by the uniform electrostatic charge thus attained, the dust collection efficiency is uniform across the width and height of the filter.

The present invention permits charging (electretization) at approximately room temperature, with the time of exposure of the filter fabric to high voltage electric field between two electrodes being only 2 to 10 sec. Thus, the time of passage of any one point on the filter web through the high voltage field, i.e. 2 to 10 sec., is only one-twentieth to one-fiftieth of that required in the conventional prior art process.

The electrode or the non-woven fabric may be covered with an electrically permeable film but such a modification of the process will typically require that the DC voltage exceed 10 KV/cm according to the thickness of film.

EXAMPLE 1

A non-woven fabric (non-treated filter), having a density of 60 g/m$^2$ and 0.7 mm in thickness, was formed of layers of melt-blow spun polypropylene fibers having a diameter of 12$\mu$ and a value $\eta$ of 0.8.

The above non-woven fabric was permanently electro-statically charged by passing same through a high voltage electric field provided between two electrodes, i.e. a discharge electrode 0.2 mm in diameter and a smooth surfaced drumlike ground electrode, at room temperature. The dwell time was 5 seconds, i.e. any one point on the web remained in tight intimate contact with the ground electrode for 5 sec.

EXAMPLE 2

A non-woven fabric identical to that of Example 1 except that the value $\eta$ of the polypropylene fibers was 1.2 was charged at room temperature in an identical manner.

EXAMPLE 3

The filter material was a non-woven fabric having a density of 30 g/m$^2$ and thickness of 0.3 mm, formed of layers of melt-blow spun polypropylene fibers of $\eta=0.5$ and diameters of 0.5 to 3$\mu$. As collected, the fibers of the various "layers" are entangled together and adhere upon cooling. The fabric was subjected to a pretreatment by corona discharge at a relatively low voltage of 6 KV/cm, followed by electrostatic charging in the manner of Example 1 at room temperature. No arcing was noted and the production was uninterruped. Arcing can interrupt production by (1) destruction of the wire electrodes or by (2) melting portions of the filter medium.

CONTROL EXAMPLE 1

A non-woven fabric of the type used in Example 1 but not electrostatically charged, was tested for dust collecting efficiency in the same manner.

CONTROL EXAMPLE 2

A non-woven fabric of polypropylene fibers of $\eta=1.7$, but otherwise similar to the fabric employed in Example 1, was electrostatically charged at room temperature following the procedure of Example 1. The charged material was then tested for dust collecting efficiency in the same manner.

CONTROL EXAMPLE 3

A non-woven fabric of the type used in Example 1 was electrostatically charged in a similar manner except with heating to 130° C. Again, the material was tested for dust collecting efficiency.

CONTROL EXAMPLE 4

A non-woven fabric similar to that of Example 3, but not pretreated, was tested for dust collecting efficiency in the same manner.

Table 1 shows results of tests for dust collecting efficiency of filter materials prepared by Examples representative of the present invention by the Control Examples. The tests demonstrate the collection efficiency both at an early stage of use and after storage for six months.

Particles of tobacco smoke of 0.3μ in diameter were used for measurement of collecting efficiency. Air is passed through HEPA (high efficiency particulate air) filter and introduced to a duct in which is mounted the filter medium to be tested, at a predetermined wind velocity (10 cm/sec). Tobacco smoke diluted with air is introduced into the duct. The number of smoke particles having diameter of 0.3 micron is counted by particle counters KC101 (Rion Company Ltd.) in front and in the rear of the filter to be tested.

Collection efficiency (%) = $(n_1 - n_2)/n_1 \times 100$ $n_1$ = number of particles in front of the filter
$n_2$ = number of particles in rear of the filter.

TABLE 1

|  | Collecting efficiency (%) | | Rate of retention |
|---|---|---|---|
|  | Early stage | 6 months after |  |
| Example 1 | 92 | 90.5 | 98.4 |
| Example 2 | 80 | 77.5 | 96.9 |
| Example 3 | 98 | 96.7 | 98.7 |
| Control Example 1 | 8.0 | 8.0 | — |
| Control Example 2 | 23.0 | 9.0 | 39.1 |
| Control Example 3 | 79.3 | 71.2 | 89.8 |
| Control Example 4 | 15.0 | 15.0 | — |

As apparent from the above, the present invention is significantly useful for inexpensively and efficiently manufacturing electret filters in which the electric charge is not neutralized by the high temperatures encountered in conventional charging techniques, which exhibit high efficiency in collecting dusts, and which retain their collecting efficiency over a long period of time.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A method of manufacturing electret filters comprising:
    providing a preformed non-woven fabric of non-polar synthetic polymer fibers having an intrinsic viscosity of 1.5 or less;
    providing a ground electrode and at least one discharge electrode adjacent said ground electrode and establishing a high voltage field therebetween;
    passing said preformed non-woven fiber fabric through the high voltage field while in contact with the ground electrode to impart a permanent electrostatic charge to said fabric, said fabric remaining at approximately room temperature as it passes through the high voltage field.

2. The method of claim 1 wherein the ground electrode is provided with a small polished metal surface, over which the fabric passes in direct, intimate contact.

3. The method of claim 1 wherein said ground electrode has a cylindrical surface and said fabric is wrapped at least 180° around said cylindrical surface as the fabric passes over said electrode.

4. The method of claim 1 wherein said voltage is 5 to 10 KV/cm.

5. The method of claim 1 wherein said ground electrode has a curved surface.

6. The method of claim 1 wherein said ground electrode has a cylindrical surface and discharge wires or bars, extending parallel to the cylindrical axis, are arranged in an arc about said cylindrical surface.

7. The process of claim 1 wherein said fibers are polyolefin.

8. The method of claim 7 wherein said polyolefin is polypropylene.

9. The method of claim 1 wherein said fibers have an intrinsic viscosity of 1.0 or less.

10. The method of claim 1 further comprising pretreating said fabric with gaseous ions prior to entry into said high voltage field.

11. The method of claim 10 wherein said ions have the same polarity as said discharge electrode.

12. The method of claim 10 wherein said ions have a polarity the opposite of said discharge electrode.

13. The method of claim 10 wherein said gaseous ions are generated by at least one corona discharge element operating at a voltage substantially lower than said high voltage field.

14. A method in accordance with claim 10 wherein said fabric is pretreated by an ionic irradiation.

15. A method in accordance with claim 3 wherein said fabric is wrapped substantially more than 180° around said cylindrical surface.

* * * * *

UNITED STATES PATENT AND TRADEMARK OFFICE
CERTIFICATE OF CORRECTION

PATENT NO. : 4,592,815
DATED : June 3, 1986
INVENTOR(S) : Etsuro NAKAO

It is certified that error appears in the above—identified patent and that said Letters Patent is hereby corrected as shown below:

Col. 6, line 16 (claim 2, line 2) "small" should be -- smooth --

Signed and Sealed this

Eighteenth Day of November, 1986

Attest:

DONALD J. QUIGG

Attesting Officer        Commissioner of Patents and Trademarks